United States Patent
Tada et al.

(10) Patent No.: US 9,654,530 B2
(45) Date of Patent: May 16, 2017

(54) STREAMING DISTRIBUTION SYSTEM, STREAMING DISTRIBUTION METHOD

(71) Applicant: FUJITSU LIMITED, Kawasaki-shi, Kanagawa (JP)

(72) Inventors: Atsuko Tada, Tokorozawa (JP); Ryuta Tanaka, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 149 days.

(21) Appl. No.: 14/088,845

(22) Filed: Nov. 25, 2013

(65) Prior Publication Data

US 2014/0289308 A1    Sep. 25, 2014

(30) Foreign Application Priority Data

Mar. 22, 2013 (JP) ................................. 2013-060407

(51) Int. Cl.
*G06F 15/16* (2006.01)
*H04L 29/06* (2006.01)
(Continued)

(52) U.S. Cl.
CPC ............ *H04L 65/60* (2013.01); *H04L 65/602* (2013.01); *H04L 65/608* (2013.01); *H04L 65/80* (2013.01);
(Continued)

(58) Field of Classification Search
CPC .............. H04L 65/607; H04N 21/2368; H04N 21/23608; H04N 21/236; H04N 21/434; H04N 21/4344; H04N 19/88
See application file for complete search history.

(56) References Cited

U.S. PATENT DOCUMENTS

| | | | | |
|---|---|---|---|---|
| 6,445,679 B1* | 9/2002 | Taniguchi | ............... | H04L 29/06 370/232 |
| 2003/0236904 A1* | 12/2003 | Walpole | .............. | H04L 12/1881 709/231 |

(Continued)

FOREIGN PATENT DOCUMENTS

| JP | 200145422 | 2/2001 |
|---|---|---|
| JP | 2006-165733 | 6/2006 |

(Continued)

OTHER PUBLICATIONS

"ISO/IEC 23009-1:2012(E), Information techonology—Dynamic adaptive streaming over HTTP (DASH)—Part 1: Media presentation description and segment formats", pp. 1-127, Jan. 5, 2012.

(Continued)

*Primary Examiner* — Krisna Lim
(74) *Attorney, Agent, or Firm* — Staas & Halsey LLP

(57) ABSTRACT

A streaming distribution system in which streaming data is transmitted from a server to a client, the streaming distribution system includes: the server includes: a first processor configured to execute a plurality of instructions, the instructions includes, rearranging at least one independently playable data item contained in the streaming data from an original position to a position at a front side of the streaming data; transmitting the rearranged streaming data to the client; and the client includes: a second processor configured to execute a plurality of instructions, the instructions includes, decoding the original streaming data that has been restored in accordance with the original position of the received independently playable data item.

17 Claims, 11 Drawing Sheets

(51) Int. Cl.
*H04N 21/2343* (2011.01)
*H04N 21/236* (2011.01)
*H04N 21/434* (2011.01)
*H04N 21/61* (2011.01)
*H04N 21/845* (2011.01)

(52) U.S. Cl.
CPC ....... *H04N 21/236* (2013.01); *H04N 21/2343* (2013.01); *H04N 21/4341* (2013.01); *H04N 21/6125* (2013.01); *H04N 21/8456* (2013.01)

(56) References Cited

U.S. PATENT DOCUMENTS

| | | | |
|---|---|---|---|
| 2005/0200764 A1* | 9/2005 | Tsuruta | H04N 7/152 348/716 |
| 2007/0126936 A1 | 6/2007 | Fujihira et al. | |
| 2010/0189131 A1* | 7/2010 | Branam | H04N 21/23424 370/474 |
| 2010/0217887 A1* | 8/2010 | Bouazizi | H04L 1/0041 709/231 |
| 2011/0138073 A1* | 6/2011 | Tanaka | H04L 45/00 709/241 |
| 2012/0158988 A1* | 6/2012 | Fatehpuria | H04L 65/4084 709/234 |
| 2014/0032987 A1* | 1/2014 | Nagaraj | H04L 65/604 714/747 |
| 2015/0244751 A1* | 8/2015 | Lee | H04N 21/41407 709/219 |

FOREIGN PATENT DOCUMENTS

| | | |
|---|---|---|
| JP | 2006-217643 | 8/2006 |
| JP | 2006-319701 | 11/2006 |
| JP | 2008-263460 | 10/2008 |
| JP | 2009-10649 | 1/2009 |
| WO | WO 2012/011466 A1 | 1/2012 |

OTHER PUBLICATIONS

Japanese Office Action dated Sep. 27, 2016 in corresponding Japanese Patent Application No. 2013-060407.
Japanese Office Action dated Dec. 13, 2016 in corresponding Japanese Patent Application No. 2013-060407.
Japanese Office Action dated Mar. 14, 2017 in corresponding Japanese Patent Application No. 2013-060407.

* cited by examiner

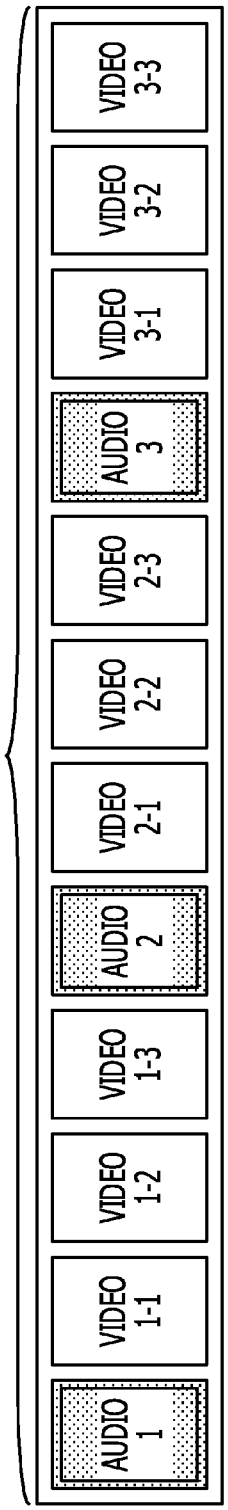
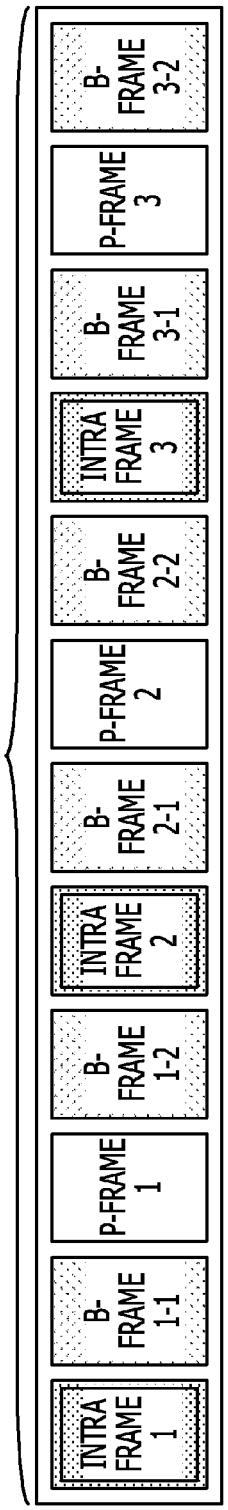
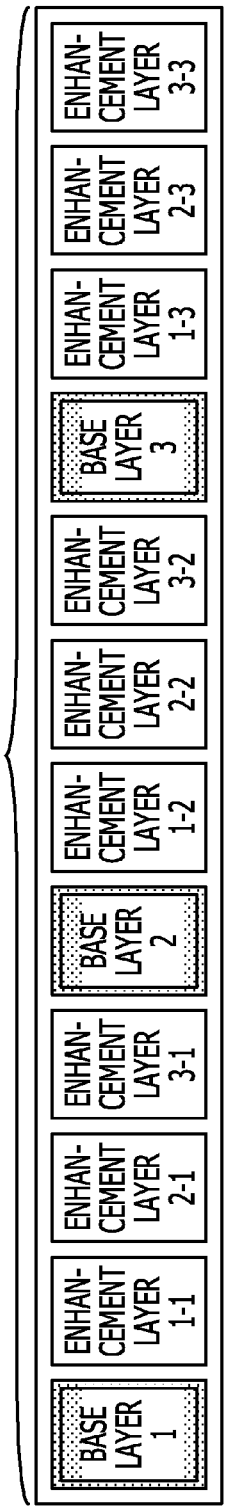

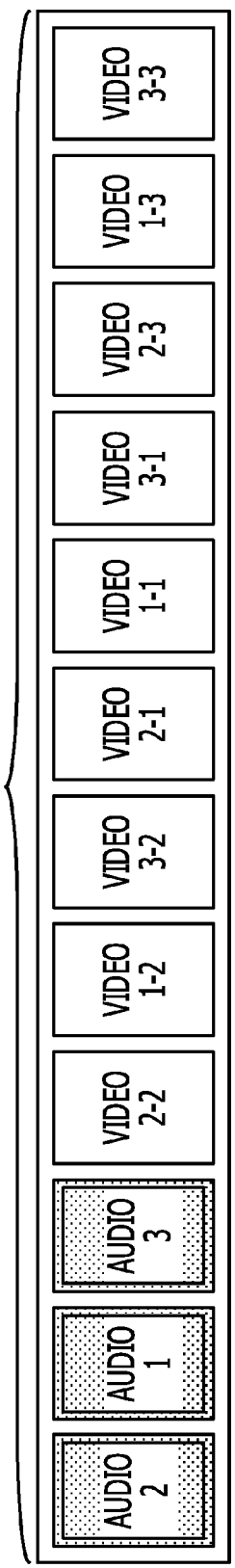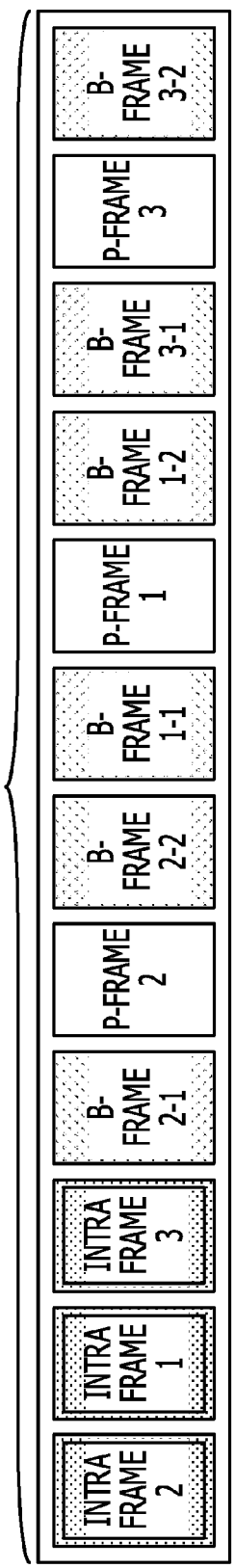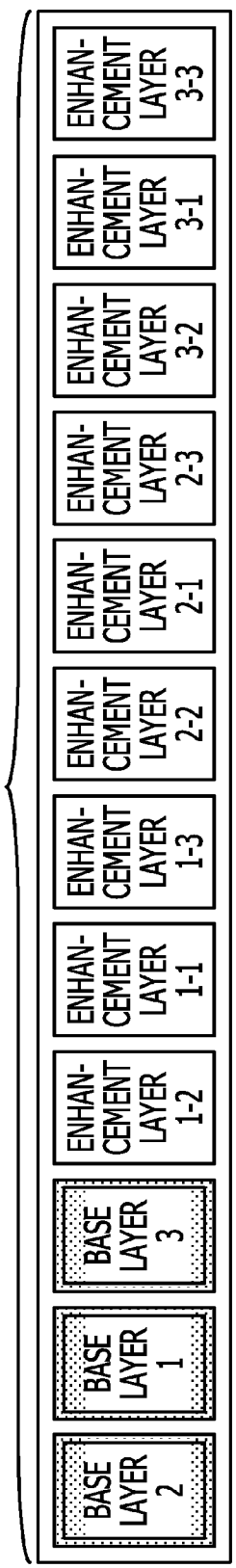

FIG. 6A

SEGMENT FILE:

| HEADER | TOTAL SEGMENT SIZE | RECEIVED DATA SIZE | INDEPENDENTLY PLAYABLE DATA (AUDIO DATA) SIZE | REARRANGED POSITION INFORMATION OF INDEPENDENTLY PLAYABLE DATA ITEMS (AUDIO DATA ITEMS) | AUDIO DATA ITEMS | REARRANGED POSITION INFORMATION OF VIDEO DATA ITEMS | VIDEO DATA ITEMS |

| ID | REARRANGED ORDER | ORIGINAL POSITION OF INDEPENDENTLY PLAYABLE DATA ITEM (Byte) | SIZE OF INDEPENDENTLY PLAYABLE DATA ITEM (Byte) |
|---|---|---|---|
| 1 | 2 | 200 | 45 |
| 2 | 1 | 1050 | 48 |
| 3 | 3 | 1540 | 45 |

FIG. 7A

| HEADER | | | | | |
|---|---|---|---|---|---|
| TOTAL SEGMENT SIZE | RECEIVED DATA SIZE | INDEPENDENTLY PLAYABLE DATA (I-FRAME DATA) SIZE | REARRANGED POSITION INFORMATION OF INDEPENDENTLY PLAYABLE DATA ITEMS (I-FRAME DATA ITEMS) | I-FRAME DATA ITEMS | REARRANGED POSITION INFORMATION OF B-FRAME AND P-FRAME DATA ITEMS | B-FRAME AND P-FRAME DATA ITEMS |

| ID | REARRANGED ORDER | ORIGINAL POSITION OF INDEPENDENTLY PLAYABLE DATA ITEM (Byte) | SIZE OF INDEPENDENTLY PLAYABLE DATA ITEM (Byte) |
|---|---|---|---|
| 1 | 2 | 3010 | 6020 |
| 2 | 1 | 29450 | 5100 |
| 3 | 3 | 35000 | 3020 |

FIG. 8A

| HEADER | TOTAL SEGMENT SIZE | RECEIVED DATA SIZE | INDEPENDENTLY PLAYABLE DATA (BASE LAYER DATA) SIZE | REARRANGED POSITION INFORMATION OF INDEPENDENTLY PLAYABLE DATA ITEMS (BASE LAYER DATA ITEMS) | BASE LAYER DATA ITEMS | REARRANGED POSITION INFORMATION OF ENHANCEMENT LAYER 1 DATA ITEMS | ENHANCEMENT LAYER 1 DATA ITEMS | ... | REARRANGED POSITION INFORMATION OF ENHANCEMENT LAYER 3 DATA ITEMS | ENHANCEMENT LAYER 3 DATA ITEMS |
|---|---|---|---|---|---|---|---|---|---|---|

| ID | REARRANGED ORDER | ORIGINAL POSITION OF INDEPENDENTLY PLAYABLE DATA ITEM (Byte) | SIZE OF INDEPENDENTLY PLAYABLE DATA ITEM (Byte) |
|---|---|---|---|
| 1 | 2 | 0 | 6020 |
| 2 | 1 | 3010 | 5100 |
| 3 | 3 | 35000 | 3020 |

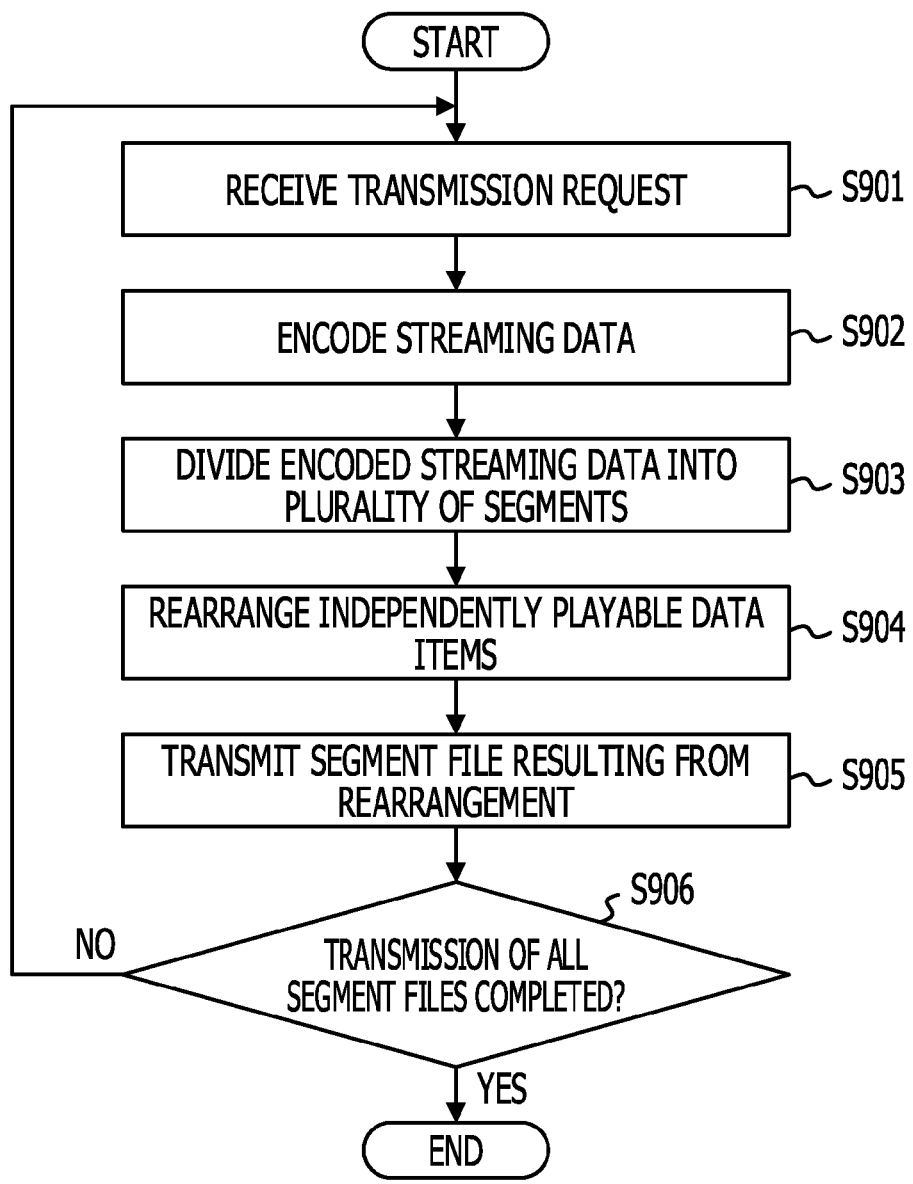

STREAMING DISTRIBUTION SYSTEM, STREAMING DISTRIBUTION METHOD

CROSS-REFERENCE TO RELATED APPLICATION

This application is based upon and claims the benefit of priority of the prior Japanese Patent Application No. 2013-060407, filed on Mar. 22, 2013, the entire contents of which are incorporated herein by reference.

FIELD

The embodiments discussed herein are related to a streaming distribution system in which segments of moving image data are generated and streaming distribution is carried out through consecutive transmission and reception of data items contained in the segments, a streaming distribution method, a computer-readable storage medium storing a streaming distribution program, and a streaming distribution server.

BACKGROUND

Recently, the increased speed of networks has enabled streaming to mobile terminals. Also, technologies for transmission and reception of moving image data using Hypertext Transfer Protocol (HTTP) have been proposed in order to provide streaming services that are aimed at mobile terminals and fixed terminals, such as personal computers (PCs). The steaming technologies using HTTP (hereinafter, referred to as HTTP streaming technologies) are technologies in which a server divides streaming data into a plurality of segments and transmits files of the segments requested by a client to the client using HTTP. The client consecutively plays the received files, thereby enabling the moving image data to be viewed.

Dynamic Adaptive Streaming over HTTP (MPEG-DASH) is one of the HTTP streaming technologies. MPEG-DASH is being standardized as International Organization for Standardization/International Electrotechnical Commission (ISO/IEC) 23009-1 and is regarded as an effective scheme for implementing multi-layer streaming distribution. MPEG-DASH aims to implement smooth streaming by using a mechanism for dynamically changing the resolution or bit rate of moving image data so as to address issues related to the network bandwidth, specs of terminals, and so forth.

A server that uses MPEG-DASH divides multi-rate streaming data into a plurality of segments so as to prepare segment files. A client checks the network bandwidth and its terminal specs on the basis of an HTTP processing rate (the downloaded size/the time taken for downloading) for example, and determines a segment file containing the moving image data having the resolution or bit rate used for streaming carried out between the server and the client.

SUMMARY

In accordance with an aspect of the embodiments, a streaming distribution system in which streaming data is transmitted from a server to a client, the streaming distribution system includes: the server includes: a first processor configured to execute a plurality of instructions, the instructions includes, rearranging at least one independently playable data item contained in the streaming data from an original position to a position at a front side of the streaming data; transmitting the rearranged streaming data to the client; and the client includes: a second processor configured to execute a plurality of instructions, the instructions includes, decoding the original streaming data that has been restored in accordance with the original position of the received independently playable data item.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which:

FIG. 3A illustrates an example of the data structure of audio and video data items contained in one segment when the audio and video data items are multiplexed;

FIG. 3B illustrates an example of the data structure of video data items contained in one segment when Moving Picture Experts Group 2 (MPEG 2) or H.264 is used to encode the video data items;

FIG. 3C illustrates an example of the data structure of video data items contained in one segment when Scalable Video Coding (SVC) is used to encode the video data items;

FIG. 5A illustrates an example of the data structure of the audio and video data items after an independently playable data item located in the vicinity of the center of the segment illustrated in FIG. 3A is preferentially rearranged to the front side of the segment;

FIG. 5B illustrates an example of the data structure of the video data items after an independently playable data item located in the vicinity of the center of the segment illustrated in FIG. 3B is preferentially rearranged to the front side of the segment;

FIG. 5C illustrates an example of the data structure of the video data items after an independently playable data item located in the vicinity of the center of the segment illustrated in FIG. 3C is preferentially rearranged to the front side of the segment;

FIG. 6A illustrates an example of the data structure of a segment file which is to be transmitted by a transmission unit and corresponds to the segment illustrated in FIG. 4A or 5A;

FIG. 6B illustrates an example of the data structure of rearranged position information of independently playable data items illustrated in FIG. 6A;

FIG. 7A illustrates an example of the data structure of a segment file which is to be transmitted by the transmission unit and corresponds to the segment illustrated in FIG. 4B or 5B;

FIG. 7B illustrates an example of the data structure of rearranged position information of independently playable data items illustrated in FIG. 7A;

FIG. 8A illustrates an example of the data structure of a segment file which is to be transmitted by the transmission unit and corresponds to the segment illustrated in FIG. 4C or 5C;

FIG. 8B illustrates an example of the data structure of rearranged position information of independently playable data items illustrated in FIG. 8A;

FIG. 9 is a flowchart of a transmission process performed by a server of the streaming distribution system;

DESCRIPTION OF EMBODIMENTS

Hereinafter, examples of a streaming distribution system, a streaming distribution method, a steaming distribution program, a streaming distribution server, and a streaming reception client according to embodiments will be described in detail with reference to the drawings. Note that these examples do not limit the disclosed technology.

First Embodiment

Figure 1:
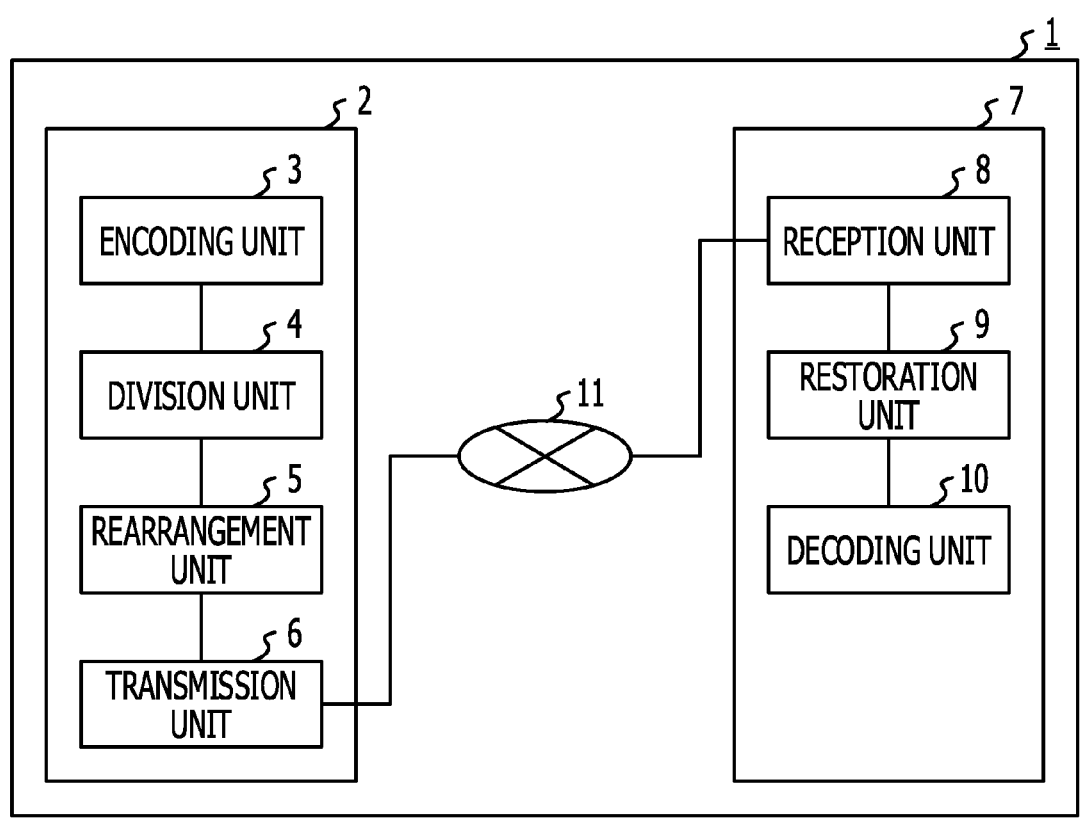
FIG. 1 is a functional block diagram of a streaming distribution system according to an embodiment.

FIG. 1 is a functional block diagram of a streaming distribution system 1 according to an embodiment. The streaming distribution system 1 includes a server 2 and a client 7. The server 2 includes an encoding unit 3, a division unit 4, a rearrangement unit 5, and a transmission unit 6. The client 7 includes a reception unit 8, a restoration unit 9, and a decoding unit 10.

The server 2 is, for example, a general-purpose computer. The client 7 is, for example, a mobile terminal. The server 2 and the client 7 are connected to each other via a network 11. The server 2 receives moving image data to be distributed through streaming (hereinafter, simply referred to as streaming data) from a storage unit (not illustrated), for example, a semiconductor memory element such as a flash memory, a hard disk, or an optical disc, of an external apparatus or the server 2; and outputs the received streaming data to the encoding unit 3.

The encoding unit 3 is, for example, a hardware circuit implemented by a wired logic. Alternatively, the encoding unit 3 may be a functional module implemented by a computer program executed in the server 2. The encoding unit 3 receives the streaming data from the server 2. The encoding unit 3 uses a given coding scheme to encode the streaming data. The encoding unit 3 outputs the encoded streaming data to the division unit 4.

Figure 2:
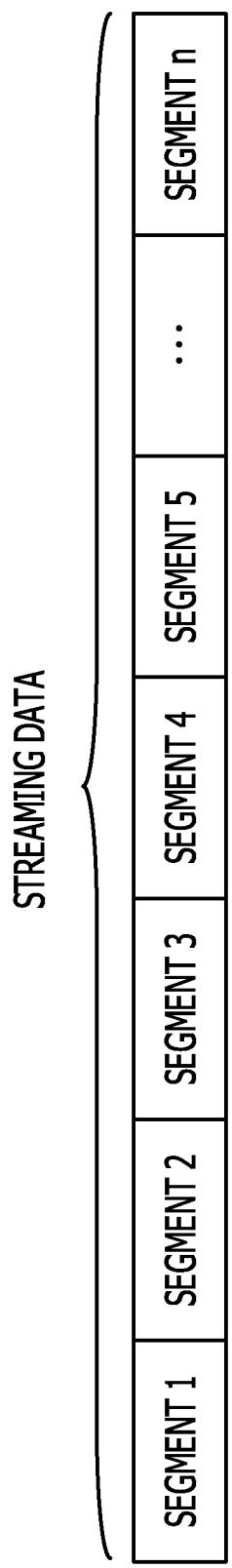
FIG. 2 is a conceptual diagram of streaming data which has been divided into segments by a division unit.

The division unit 4 is, for example, a hardware circuit implemented by a wired logic. Alternatively, the division unit 4 may be a functional module implemented by a computer program executed in the server 2. The division unit 4 receives the encoded streaming data from the encoding unit 3. The division unit 4 divides the encoded streaming data into segments in given units. FIG. 2 is a conceptual diagram of streaming data which has been divided into segments by the division unit 4. As illustrated in FIG. 2, the division unit 4 divides the encoded streaming data into segments in given units. Also, the division unit 4 may assign segment identifiers (IDs) to the plurality of divided segments as illustrated in FIG. 2. Note that one segment contains streaming data of approximately seven to ten seconds, for example, which is constituted by a plurality of audio and video data items according to the coding type. Further, in order to dynamically cope with the network bandwidth (which may be referred to as a traffic state), the division unit 4 may pre-generate a plurality of segments having different coding rates and may select a segment to be output to the rearrangement unit 5 in accordance with a reception state of the client 7 (described later).

FIG. 3A illustrates an example of the data structure of audio and video data items contained in one segment when the audio and video data items are multiplexed. FIG. 3B illustrates an example of the data structure of video data items contained in one segment when Moving Picture Experts Group-2 (MPEG-2) or H.264 is used to encode the video data items. FIG. 3C illustrates an example of the data structure of video data items contained in one segment when Scalable Video Coding (SVC) is used to encode the video data items. Video data items may be multiplexed with audio data items also in the cases of FIGS. 3B and 3C. In this case, the resulting data has the data structure similar to that of FIG. 3A, and thus a detailed description thereof will be omitted.

Referring to FIG. 3A, several sets of an audio data item and video data items associated with the audio data item are periodically contained in one segment. Referring to FIG. 3B, several sets of an intra-frame (I-frame) data item, bidirectionally predictive frame (B-frame) data items, and a predictive frame (P-frame) data item are periodically contained in one segment. Referring to FIG. 3C, several sets of a base layer data item and three-enhancement-layer data items (that is, an enhancement layer 1 data item, an enhancement layer 2 data item, and an enhancement layer 3 data item) are periodically contained in one segment. As illustrated in FIGS. 3A to 3C, the division unit 4 may assign data IDs to the data items. The data IDs may indicate, for example, the time-based order in which the streaming data is to be played. In other words, the plurality of data items contained in one segment illustrated in FIGS. 3A to 3C are progressively multiplexed along the time axis. The division unit 4 outputs the plurality of divided segments to the rearrangement unit 5.

The rearrangement unit 5 illustrated in FIG. 1 is, for example, a hardware circuit implemented by a wired logic. Alternatively, the rearrangement unit 5 may be a functional module implemented by a computer program executed in the server 2. The rearrangement unit 5 receives the segments, obtained by dividing the streaming data, from the division unit 4. The rearrangement unit 5 rearranges independently playable data items contained in each segment to the front side of the segment. Here, for ease of explanation, a definition is made such that independently playable data items are at least one of audio data items, base layer data items, or I-frame data items. The independently playable data items are data items that independently enable audio or video to be played. For example, playback based on B-frame, P-frame, and enhancement layer 1 to 3 data items, which are other than the independently playable data items, involves reference to corresponding I-frame and base layer data items. Thus, these data items are not independently playable data items.

Figure 4A:
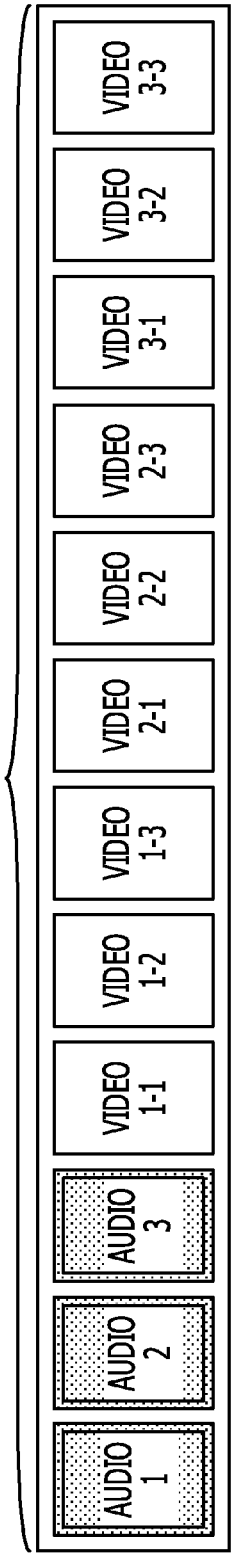
FIG. 4A illustrates an example of the data structure of the audio and video data items after independently playable data items contained in the segment illustrated in FIG. 3A are rearranged to the front side of the segment.
Figure 4B:
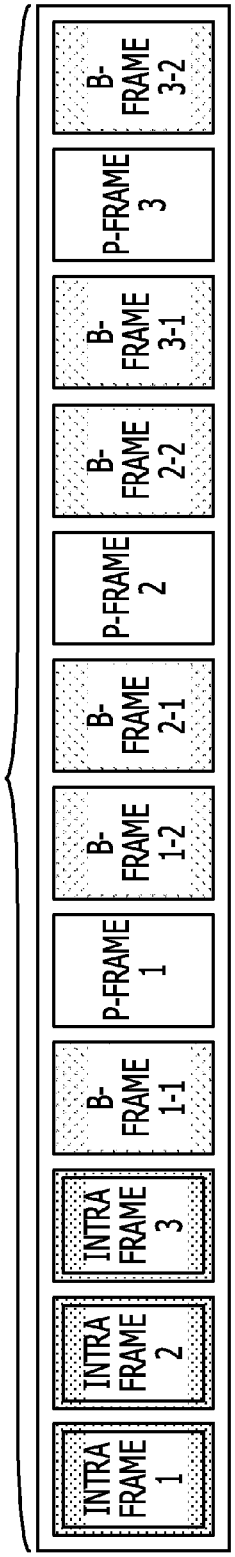
FIG. 4B illustrates an example of the data structure of the video data items after independently playable data items contained in the segment illustrated in FIG. 3B are rearranged to the front side of the segment.
Figure 4C:
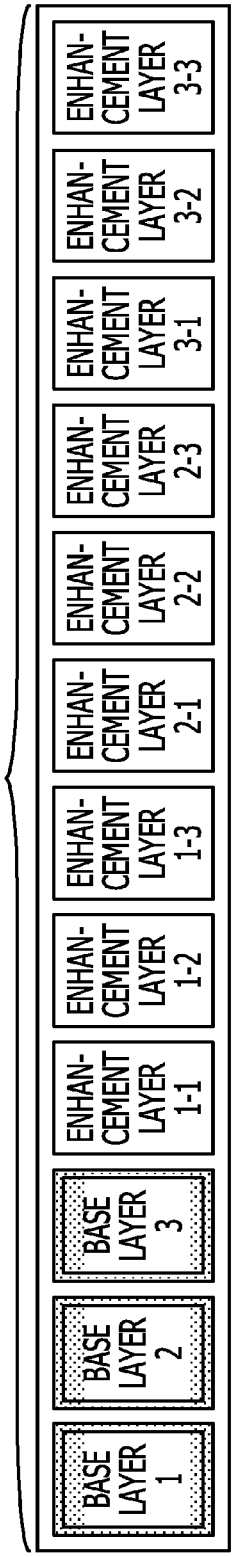
FIG. 4C illustrates an example of the data structure of the video data items after independently playable data items contained in the segment illustrated in FIG. 3C are rearranged to the front side of the segment.

FIG. 4A illustrates an example of the data structure of the audio and video data items after independently playable data items contained in the segment illustrated in FIG. 3A are rearranged to the front side of the segment. FIG. 4B illustrates an example of the data structure of the video data items after independently playable data items contained in the segment illustrated in FIG. 3B are rearranged to the front side of the segment. FIG. 4C illustrates an example of the data structure of the video data items after independently playable data items contained in the segment illustrated in FIG. 3C are rearranged to the front side of the segment.

Referring to FIG. 4A, the audio data items are rearranged to the front side of the segment by the rearrangement unit 5, but the order of the video data items is not changed. This data structure significantly increases the probability of successful playback of audio data because the audio data items contained at the front side of the segment are preferentially received even if the client 7 fails to receive the entire segment file because of a decrease in the network bandwidth, for example. In general, audio data is more important than video data when the user is viewing streaming data. Accordingly, it is effective to play streaming data without interruption of audio data.

Referring to FIG. 4B, the I-frame data items are rearranged to the front side of the segment by the rearrangement unit 5, but the order of the B-frame and P-frame data items is not changed. This data structure significantly increases the probability of successful playback of video data because the I-frame data items contained at the front side of the segment are preferentially received even if the client 7 fails to receive the entire segment file because of a decrease in the network bandwidth, for example.

Referring to FIG. 4C, the base layer data items are rearranged to the front side of the segment by the rearrangement unit 5. Also, the three-enhancement-layer data items, that is, the enhancement layer 1 to 3 data items are rearranged in the order of enhancement layer 1 data items (1-1 to 1-3), enhancement layer 2 data items (2-1 to 2-3), and enhancement layer 3 data items (3-1 to 3-3). This is because the enhancement layer 1 has the highest contribution and the enhancement layer 3 has the lowest contribution to complementation of the base layer. This data structure significantly increases the probability of successful playback of video data because the base layer data items contained at the front side of the segment are preferentially received even if the client 7 fails to receive the entire segment file because of a decrease in the network bandwidth, for example. Further, because the enhancement layer 1 to 3 data items are rearranged in descending order of contribution to complementation of the base layer, the probability of successful playback of higher-quality video data is increased.

Note that in addition to the data structure rearrangement methods illustrated in FIGS. 4A to 4C, the rearrangement unit 5 may carry out rearrangement more suitable for playback of streaming data. Specifically, the rearrangement unit 5 preferentially rearranges an independently playable data item located in the vicinity of the center of one segment in the time domain to the front side of the segment. FIG. 5A illustrates an example of the data structure of the audio and video data items after an independently playable data item located in the vicinity of the center of the segment illustrated in FIG. 3A is preferentially rearranged to the front side of the segment. FIG. 5B illustrates an example of the data structure of the video data items after an independently playable data item located in the vicinity of the center of the segment illustrated in FIG. 3B is preferentially rearranged to the front side of the segment. FIG. 5C illustrates an example of the data structure of the video data items after an independently playable data item located in the vicinity of the center of the segment illustrated in FIG. 3C is preferentially rearranged to the front side of the segment.

Referring to FIG. 5A, an audio data item 2, which is an independently playable data item located in the vicinity of the center of the segment, is preferentially rearranged to the front side of the segment over an audio data item 1 by the rearrangement unit 5. Also, video data items 2-2, 1-2, and 3-2 each located in the vicinity of the center of the corresponding audio data items are preferentially rearranged to the front side of the segment over video data items 2-1, 1-1, and 3-1, respectively. Even if the client 7 receives the audio data item 2 alone because of a decrease in the network bandwidth, for example, this data structure may implement playback of streaming data that appears to be natural for the user through playback of the audio data item located in the vicinity of the center of the segment for a longer period. Also, referring to FIG. 5A, if the client 7 receives the audio data item 2 to the video data item 3-2, playback of streaming data that appears to be natural for the user may be carried out through mutual complementation of the video data items 2-2, 2-1, and 3-2.

Referring to FIG. 5B, an I-frame data item 2, which is an independently playable data item located in the vicinity of the center of the segment, is preferentially rearranged to the front side of the segment over an I-frame data item 1 by the rearrangement unit 5. Also, B-frame data items 2-1 and 2-2 and a P-frame data item 2 are preferentially rearranged to the front side of the segment over B-frame data items 1-1 and 1-2 and a P-frame data item 1, respectively. Even if the client 7 receives the I-frame data item 2 alone because of a decrease in the network bandwidth, for example, this data structure may implement playback of streaming data that appears to be natural for the user through playback of the video data item located in the vicinity of the center of the segment for a longer period. Also, referring to FIG. 5B, if the client 7 receives the I-frame data item 2 to the B-frame data item 2-2, playback of streaming data that appears to be natural for the user may be implemented through preferential decoding of video data items located in the vicinity of the center of the segment and mutual complementation of the I-frame data items 2, 1, and 3.

Referring to FIG. 5C, a base layer data item 2, which is an independently playable data item located in the vicinity of the center of the segment, is preferentially rearranged to the front side of the segment over a base layer data item 1 by the rearrangement unit 5. Also, in the enhancement layers 1, 2, and 3, enhancement layer data items 1-2, 2-2, and 3-2 each located at the center in the corresponding enhancement layer are preferentially rearranged to the front side of the segment over enhancement layer data items 1-1, 2-1, and 3-1, respectively. Even if the client 7 receives the base layer data item 2 alone because of a decrease in the network bandwidth, for example, this data structure may implement playback of streaming data that appears to be natural for the user through playback of the video data item located in the vicinity of the center of the segment for a longer period. Also, referring to FIG. 5C, if the client 7 receives the base layer data item 2 to the enhancement layer data item 1-3, the quality of the base layer data items 2, 1, and 3 is increased as a result of complementation by the enhancement layer data items 1-2, 1-1, and 1-3, respectively. As a result, playback of streaming data that appears to be natural for the user may be implemented.

The rearrangement unit 5 outputs the plurality of segment files resulting from the rearrangement to the transmission unit 6. Note that the rearrangement unit 5 may use any given combination of the rearrangement methods illustrated in FIGS. 4A to 4C and 5A to 5C for rearrangement.

The transmission unit 6 illustrated in FIG. 1 is, for example, a hardware circuit implemented by a wired logic. Alternatively, the transmission unit 6 may be a functional module implemented by a computer program executed in the server 2. The transmission unit 6 receives the plurality of segment files resulting from the rearrangement from the rearrangement unit 5. The transmission unit 6 transmits the segment files to the reception unit 8 via the network 11, for example. Note that the transmission unit 6 may use, for example, HTTP as the communication protocol.

FIG. 6A illustrates an example of the data structure of a segment file which is to be transmitted by the transmission unit 6 and corresponds to the segment illustrated in FIG. 4A or 5A. The data structure of the segment file illustrated in FIG. 6A includes items, such as a header, a total segment size, a received data size, an independently playable data size, and rearranged position information of independently playable data items. In the header, for example, the segment ID of each segment illustrated in FIG. 2 is stored. Also, in the header, a command for instructing the restoration unit 9 (described later) to restore each data item that has been rearranged by the rearrangement unit 5 to the original position may be stored. In the total segment size, for example, the total sum of sizes of data items contained in one segment is stored. In the received data size, for example, zero is initially stored. In the received data size, the client 7 stores the size of received data of one segment file. In the independently playable data size, for example, the total sum of sizes of audio data items contained in one segment file is stored. Based on the independently playable data size and the received data size, the client 7 may determine the playback quality of the segment. In the rearranged position information of independently playable data items, for example, the original position of each independently playable data item within the segment is stored.

FIG. 6B illustrates an example of the data structure of the rearranged position information of independently playable data items illustrated in FIG. 6A. A table 60 illustrated in FIG. 6B includes items, such as an ID, a rearranged order, an original position of the independently playable data item, and a size of the independently playable data item. The ID may be the same as, for example, the data ID that is assigned to a corresponding data item illustrated in the data structure in FIG. 4A or 5A. The rearranged order indicates the order in which the start position of each data item is stored within one segment after being rearranged by the rearrangement unit 5. The original position of the independently playable data item indicates the original position relative to the start position of one segment, which is denoted by zero, for example. The size of the independently playable data item indicates, for example, the size of each independently playable data item. The items included in the table 60 illustrated in FIG. 6B may be used by the client 7 to restore the plurality of data items that have been rearranged by the rearrangement unit 5 to the original positions. Referring to FIG. 6A, the audio and video data items are stored, for example, in the order illustrated in FIG. 4A or 5A. Rearranged position information of video data items has the structure similar to that of the rearranged position information of independently playable data items illustrated in FIG. 6B, and thus a detailed description thereof will be omitted.

FIG. 7A illustrates an example of the data structure of a segment file which is to be transmitted by the transmission unit 6 and corresponds to the segment illustrated in FIG. 4B or 5B. In the data structure illustrated in FIG. 7A, items such as the header, the total segment size, the received data size, the independently playable data size, and the rearranged position information of independently playable data items are similar to those of the data structure illustrated in FIG. 6A, and thus a detailed description thereof will be omitted. FIG. 7B illustrates an example of the data structure of the rearranged position information of independently playable data items illustrated in FIG. 7A. A table 70 illustrated in FIG. 7B has the structure similar to that of the table 60 illustrated in FIG. 6B, and thus a detailed description thereof will be omitted. Referring to FIG. 7A, I-frame, B-frame, and P-frame data items are stored, for example, in the order illustrated in FIG. 4B or 5B. Rearranged position information of B-frame and P-frame data items has the data structure similar to that of the rearranged position information of independently playable data items illustrated in FIG. 7B, and thus a detailed description thereof will be omitted.

FIG. 8A illustrates an example of the data structure of a segment file which is to be transmitted by the transmission unit 6 and corresponds to the segment illustrated in FIG. 4C or 5C. In the data structure illustrated in FIG. 8A, items such as the header, the total segment size, the received data size, the independently playable data size, and the rearranged position information of independently playable data items are similar to those of the data structure illustrated in FIG. 6A, and thus a detailed description thereof will be omitted. FIG. 8B illustrates an example of the data structure of the rearranged position information of independently playable data items illustrated in FIG. 8A. A table 80 illustrated in FIG. 8B has a structure similar to that of the table 60 illustrated in FIG. 6B, and thus a detailed description thereof will be omitted. Referring to FIG. 8A, the base layer and enhancement layer 1 to 3 data items are stored, for example, in the order illustrated in FIG. 4C or 5C. Rearranged position information of enhancement layer 1 to 3 data items has the data structure similar to that of the rearranged position information of independently playable data items illustrated in FIG. 8B, and thus a detailed description thereof will be omitted. Note that the transmission unit 6 may transmit to, the reception unit 8, a segment file having a combined data structure of the data structures illustrated in FIGS. 6A, 7A, and 8A.

The reception unit 8 illustrated in FIG. 1 is, for example, a hardware circuit implemented by a wired logic. Alternatively, the reception unit 8 may be a functional module implemented by a computer program executed in the client 7. The reception unit 8 receives the plurality of segment files transmitted by the transmission unit 6, and successively updates the received data size illustrated in FIG. 6A, 7A, or 8A to the size of the received data. Note that the reception unit 8 may use, for example, HTTP as the communication protocol. Further, the reception unit 8 may receive the plurality of segment files in response to a streaming data transmission request made to the server 2 by the client 7.

Also, the reception unit 8 may set a given reception time limit (for example, ten seconds). When the reception time limit has passed, the reception unit 8 may stop receiving the current segment file and may make a transmission request for the next segment file. For example, suppose that the reception unit 8 starts receiving the segment 3 illustrated in FIG. 2. In this case, if the reception time limit has passed before the reception unit 8 receives the entire data of the segment 3, the reception unit 8 may stop receiving the segment 3 and start receiving the segment 4. Also, the reception unit 8 may measure the reception rate for each segment and make a transmission request for a segment file having a resolution or bit rate corresponding to the network bandwidth to the server 2. Further, the reception unit 8 may dynamically change the reception time limit in accordance with the network bandwidth. The reception unit 8 outputs the plurality of received segment files to the restoration unit 9.

The restoration unit 9 illustrated in FIG. 1 is, for example, a hardware circuit implemented by a wired logic. Alternatively, the restoration unit 9 may be a functional module implemented by a computer program executed in the client 7. The restoration unit 9 receives the plurality of segment files from the reception unit 8. The restoration unit 9 restores the original streaming data. The restoration unit 9 refers to the received data size, which is illustrated in FIG. 6A, 7A, or 8A and has been updated by the reception unit 8, and compares the received data size with the total segment size and the independently playable data size. When the received data size is equal to the total segment size, the restoration unit 9 may determine that the entire segment has been received. When the received data size is greater than or equal to the independently playable data size and is less than the total segment size, the restoration unit 9 may determine that all independently playable data items contained in the segment have been received. Also, when the received data size is less than the independently playable data size and the total segment size, the restoration unit 9 may determine independently playable data items contained in the segment have been received partially. The following describes processing performed by the restoration unit 9 in individual cases.

(1) when the Received Data Size is Equal to the Total Segment Size

This case implies that the reception unit 8 has received the entire segment. Accordingly, the restoration unit 9 restores the original order of the data items by referring to the rearranged position information of independently playable data items and the rearranged position information of video data items, B-frame and P-frame data items, or enhancement layer 1 to 3 data items illustrated in FIG. 6A, 7A, or 8A. Each segment is restored by the restoration unit 9 to have, for example, a corresponding one of the data structures illustrated in FIG. 3A to 3C.

(2) when the Received Data Size is Greater than or Equal to the Independently Playable Data Size and is Less than the Total Segment Size This case implies that the reception unit 8 has received all independently playable data items contained in one segment. Accordingly, the restoration unit 9 restores the original order of the independently playable data items by referring to the rearranged position information of independently playable data items illustrated in FIG. 6A, 7A, or 8A. When the video data items, B-frame and P-frame data items, or enhancement layer 1 to 3 data items have been partially received in addition to the independently playable data items, the restoration unit 9 restores the original order of the data items by also referring to the rearranged position information of video data items, B-frame and P-frame data items, or enhancement layer 1 to 3 data items. Regarding the rest of the video data items that the reception unit 8 has not received, the restoration unit 9 may restore the original order of the data items by using alternative data items, which are for example blank data items, video data items obtained by extending the playback interval of the independently playable data items, or video data items generated through mutual complementation of the received video items.

(3) when the Received Data Size is Less than the Independently Playable Data Size and the Total Segment Size In this case, the reception unit 8 has partially received the independently playable data items contained in one segment. Accordingly, the restoration unit 9 restores the original order of the received independently playable data items by referring to the rearranged position information of the received independently playable data items illustrated in FIG. 6A, 7A, or 8A. Regarding the rest of the video data items that the reception unit 8 has not received, the restoration unit 9 performs the following processing. If the independently playable data items are audio data items, the restoration unit 9 may restore the original order of the data items by using, as alternative data items of the not-received data items, for example, audio data items obtained by extending the playback interval of the received audio data items along the time axis. If the independently playable data items are video data items, the restoration unit 9 may restore the original order of the data items by using, as alternative data items, for example, blank data items, video data items obtained by extending the playback interval of the received independently playable data items, or video data items generated as a result of mutual complementation of the received video data items.

The restoration unit 9 illustrated in FIG. 1 sequentially outputs, to the decoding unit 10, the plurality of segments in each of which the original order of data items that have been rearranged by the rearrangement unit 5 is restored.

The decoding unit 10 illustrated in FIG. 1 is, for example, a hardware circuit implemented by a wired logic. Alternatively, the decoding unit 10 may be a functional module implemented by a computer program executed in the client 7. The decoding unit 10 receives from the restoration unit 9 the segments in which the original order of data items has been restored, decodes the segments using a given decoding scheme, and sequentially plays the streaming data. Alternatively, the decoding unit 10 may play the streaming data while temporarily storing the streaming data in a memory or cache (not illustrated) of the decoding unit 10. Alternatively, the decoding unit 10 may receive the plurality of segments not from the restoration unit 9 but from the reception unit 8. In this case, the decoding unit 10 may perform decoding processing while restoring the original order of data items of each segment file using any of the above-described restoration methods used (1) when the received data size is equal to the total segment size, (2) when the received data size is greater than or equal to the independently playable data size and is less than the total segment size, and (3) when the received data size is less than the independently playable data size and the total segment size.

Note that functional units of the streaming distribution system 1 may be implemented by integrated circuits, for example, application specific integrated circuits (ASICs) or field programmable gate arrays (FPGAs).

FIG. 9 is a flowchart of a transmission process performed by the server 2 of the streaming distribution system 1. The server 2 receives a streaming data transmission request from the client 7 (step S901). The encoding unit 3 receives streaming data from the server 2. The encoding unit 3 encodes the streaming data using a given coding scheme (step S902). The encoding unit 3 outputs the encoded streaming data to the division unit 4. The division unit 4 receives the encoded streaming data from the encoding unit 3. The division unit 4 divides the encoded streaming data into segments in given units (step S903). Note that each segment contains a plurality of audio and image data items according to the coding scheme. Further, in order to dynamically cope with the network bandwidth (which may be referred to as the traffic state), the division unit 4 may pre-generate a plurality of segments having different coding rates and select a segment to be output to the rearrangement unit 5 in accordance with the reception state of the client 7. Note that the reception state of the client 7 may be contained, for example, in the transmission request received in step S901.

The rearrangement unit 5 receives the segments obtained by dividing the streaming data from the division unit 4. The rearrangement unit 5 rearranges independently playable data items contained in each segment to the front side of the segment (step S904). The rearrangement unit 5 outputs a plurality of segment files resulting from the rearrangement to the transmission unit 6. Note that the rearrangement unit 5 may perform the rearrangement by using any given combination of the rearrangement methods illustrated in FIGS. 4A to 4C and 5A to 5C. The transmission unit 6 receives the plurality of segment files resulting from the rearrangement from the rearrangement unit 5. The transmission unit 6 transmits the segment files to the reception unit 8, for example, via the network 11 (step S905). Note that the transmission unit 6 may use, for example, HTTP as the communication protocol.

The transmission unit 6 determines whether transmission of all the segment files in response to the transmission request received in step S901 has been completed (step S906). If transmission of all the segment files has not been completed (NO in step S906), the transmission unit 6 repeats processing of steps S901 to S906. If transmission of all the segment files has been completed (YES in step S906), the server 2 terminates the transmission process illustrated in the flowchart of FIG. 9.

Figure 10:
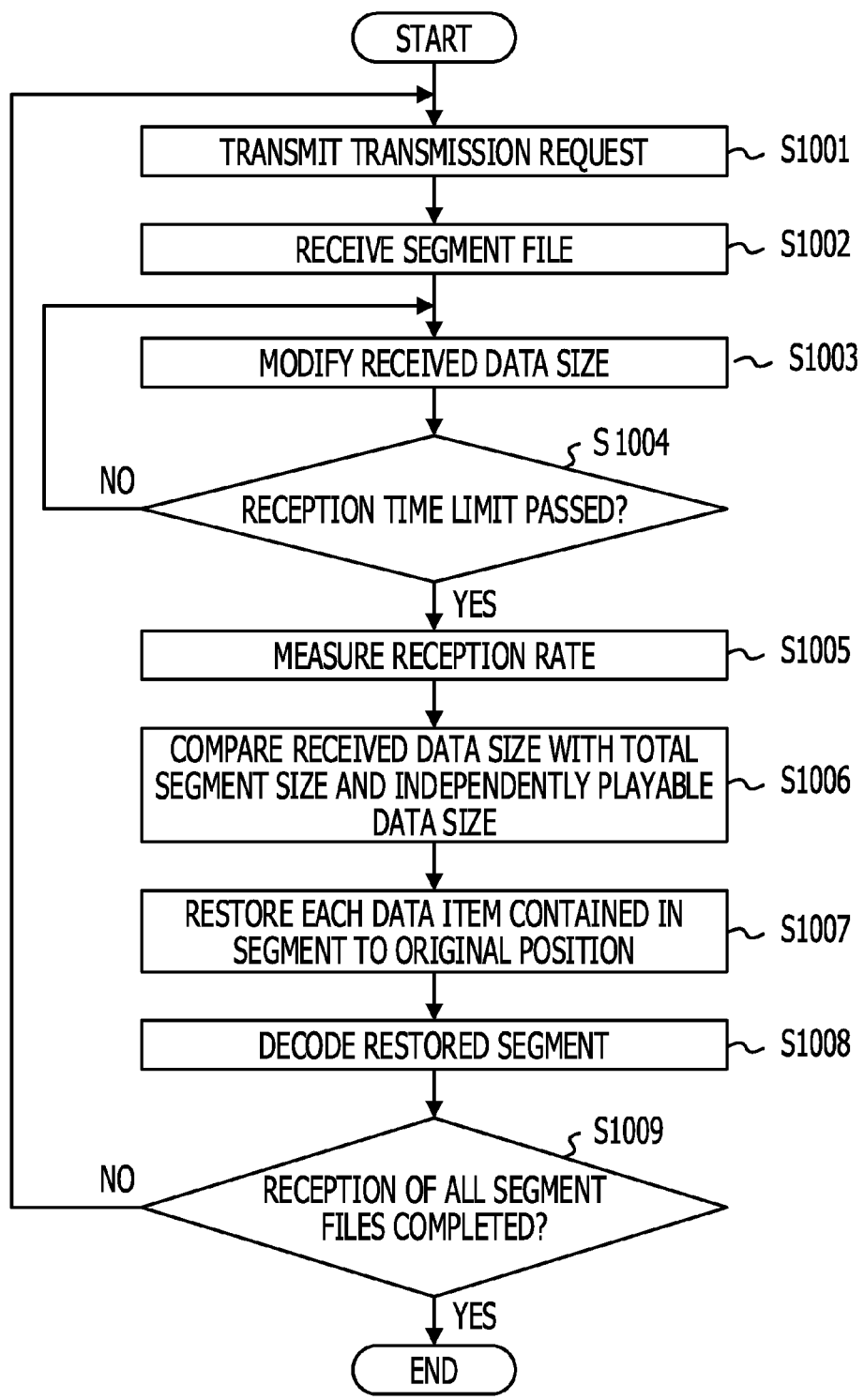
FIG. 10 is a flowchart of a reception process performed by a client of the streaming distribution system.

FIG. 10 is a flowchart of a reception process performed by the client 7 of the streaming distribution system 1. The reception unit 8 transmits a streaming data transmission request to the server 2 (step S1001). The reception unit 8 receives a segment file transmitted by the transmission unit 6 (step S1002). Note that the reception unit 8 may use, for example, HTTP as the communication protocol. The reception unit 8 sequentially updates (modifies) the received data size illustrated in FIG. 6A, 7A, or 8A to the size of the received data of the segment (step S1003).

The reception unit 8 determines whether or not a given reception time limit (for example, ten seconds) set by the reception unit 8 has passed (step S1004). If the given reception time limit has not passed (NO in step S1004), the reception unit 8 repeatedly performs processing of steps S1003 and S1004. If the given reception time limit has passed (YES in step S1004), the reception unit 8 measures the reception rate (step S1005). The reception rate may be calculated, for example, by dividing the received data size by the time taken for reception. Then, the restoration unit 9 receives the segment from the reception unit 8. The restoration unit 9 refers to the received data size illustrated in FIG. 6A, 7A, or 8A and updated by the reception unit 8, and compares the received data size with the total segment size and the independently playable data size (step S1006). The restoration unit 9 restores the data items contained in the segment to the original positions using any of the above-described restoration methods used (1) when the received data size is equal to the total segment size, (2) when the received data size is greater than or equal to the independently playable data size and is less than the total segment size, and (3) when the received data size is less than the independently playable data size and the total segment size (step S1007). The restoration unit 9 outputs the segment, in which the original order of the data items that have been rearranged by the rearrangement unit 5 is restored, to the decoding unit 10.

The decoding unit 10 receives the segment in which the original order of the data items is restored from the restoration unit 9, decodes the segment using a given decoding scheme, and sequentially plays the streaming data (step S1008). The client 7 determines whether reception of all the segments has been completed (step S1009). If reception of all the segments has not been completed (NO in step S1009), the client 7 repeats processing of steps S1001 to S1009. Note that, the information of the reception rate measured in step S1005 may be contained in the transmission request in step S1001. Also, step S1009 may be performed between step S1005 and S1006. If reception of all the segments has been completed (YES in step S1009), the client 7 terminates the reception process illustrated in the flowchart of FIG. 10.

In the streaming distribution system 1 according to the first embodiment, streaming data may be successfully played even if reception delay occurs because of a decrease in the network bandwidth. Specifically, with a streaming distribution method according to the related art, playback of streaming data is interrupted unless the entire segment is successfully received. In contrast, in the first embodiment, when one segment is received partially, playback of streaming data may be continued at a quality corresponding to the reception state without being interrupted.

In streaming distribution according to the related art, the server progressively multiplexes streaming data along the time axis without dividing the streaming data in units of segments because the client performs demultiplexing and playback processing every time the client receives a portion of long streaming data. In such streaming data, there is no distinction of a data item that is difficult to receive (is likely to fail to be received). Because of the above reasons, there is no motivation for rearranging data items in streaming distribution according to the related art. The same applies to, for example, MPEG-DASH in which streaming data is divided and distributed in units of segments. With MPEG-DASH according to the related art, the streaming data is just divided into segments and the segments are transmitted. Thus, in MPEG-DASH-based streaming distribution, when one segment is received partially, playback delay may occur or all the received data items are unused because it is determined that a reception error has occurred. In contrast, in the first embodiment, when one segment is received partially, playback of streaming data may be continued at a quality corresponding to the reception state without being interrupted.

Second Embodiment

Figure 11:
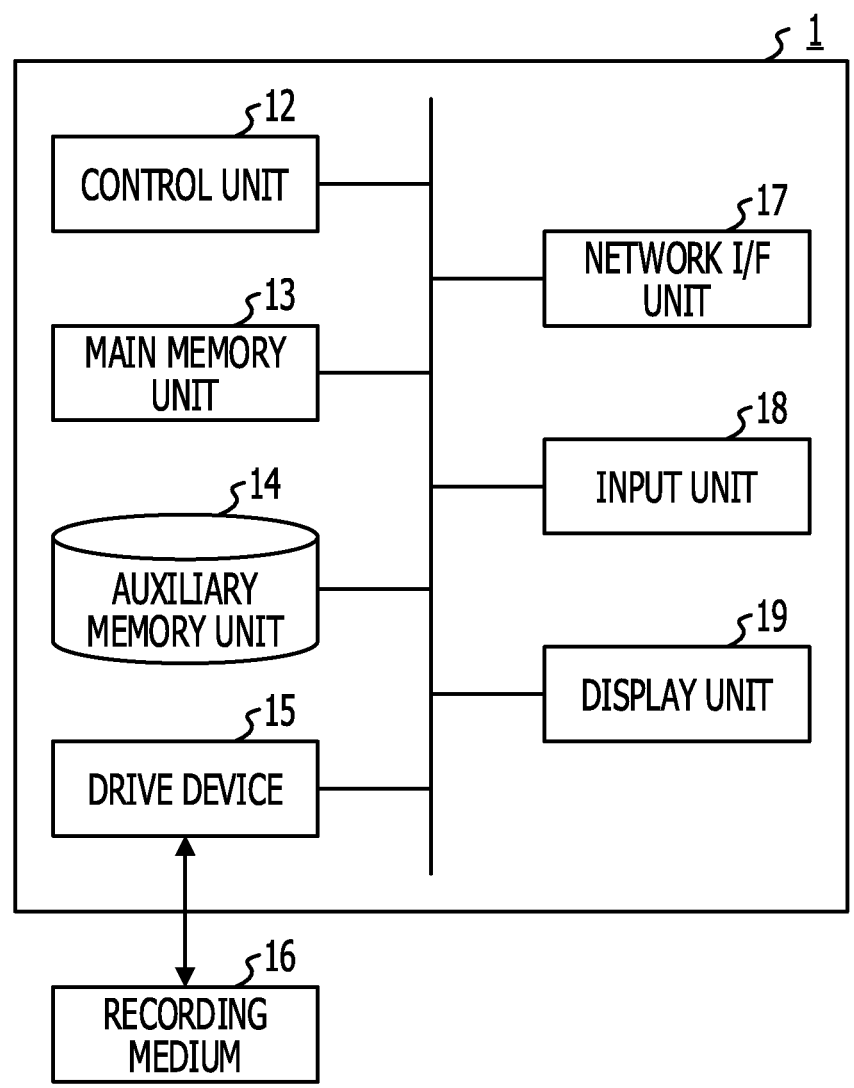
FIG. 11 is a hardware configuration diagram of the streaming distribution system according to an embodiment.

FIG. 11 is a hardware configuration diagram of the streaming distribution system 1 according to an embodiment. As illustrated in FIG. 11, the streaming distribution system 1 includes a control unit 12, a main memory unit 13, an auxiliary memory unit 14, a drive device 15, a network interface (I/F) unit 17, an input unit 18, and a display unit 19, which are interconnected via a bus so as to transmit and receive data.

The control unit 12 is, for example, a central processing unit (CPU) that controls each device and performs computation and processing on data in a computer. Alternatively, the control unit 12 is, for example, a processing unit that executes programs stored in the main memory unit 13 and the auxiliary memory unit 14. The control unit 12 receives data from the input unit 18 or an external storage device, performs computation and processing on the data, and outputs the resulting data to the display unit 19, the external storage device, and so forth.

The main memory unit 13 includes a read only memory (ROM) and a random access memory (RAM). The main memory unit 13 is a storage device that stores or temporarily stores programs, such as an operating system (OS) which is the basic software and application software, executed by the control unit 12, and data.

The auxiliary memory unit 14 includes a hard disk drive (HDD). The auxiliary memory unit 14 is a storage device that stores data, such as data related to application software.

The drive device 15 reads a program from a recording medium 16, for example, a flexible disk, and installs the program into the auxiliary memory unit 14.

A certain program may be stored on the recording medium 16. The program stored on this recording medium 16 is installed into the streaming distribution system 1 via the drive device 15. The installed certain program may be executed by the streaming distribution system 1.

The network I/F unit 17 serves as an interface to a peripheral device which has a communication function and is connected thereto via a network, such as a local area network (LAN) or wide area network (WAN) that is constructed by data channels, such as wireless or wired lines.

The input unit 18 includes a keyboard which includes cursor keys, numeral keys, and various function keys; and a mouse or slide pad used to select a key displayed on the display screen of the display unit 19, for example. The input unit 18 serves as a user interface used by the user to give an operation instruction to the control unit 12 or to input data.

The display unit 19 includes a cathode ray tube (CRT) or liquid crystal display (LCD). An image is displayed on the display unit 19 in accordance with display data input thereto from the control unit 12.

Note that the above-described streaming distribution processes may be implemented as a program to be executed by a computer. This program is installed from a server or the like into a computer and executed by the computer, whereby the above-described streaming distribution processes may be implemented. Alternatively, this program may be recorded on the recording medium 16 and a computer or mobile terminal may read the recording medium 16 storing this program thereon, whereby the above-described streaming distribution processes may be implemented. As the recording medium 16, a recording medium of various types, for example, a recording medium that records information optically, electrically, or magnetically, such as a compact disc-read only memory (CD-ROM), a flexible disk, or a magneto-optical disk; or a semiconductor memory that records information electrically, such as a ROM or a flash memory, may be used.

Third Embodiment

A streaming distribution server according to a third embodiment will be described. The streaming distribution server includes the encoding unit 3, the division unit 4, the rearrangement unit 5, and the transmission unit 6, just like the server 2 illustrated in FIG. 1. The streaming distribution server has functions equivalent to those of the server 2 described in the first embodiment, and thus a detailed description thereof will be omitted. The streaming distribution server according to the third embodiment enables the client to successfully play streaming data even if reception delay occurs because of a decrease in the network bandwidth.

Fourth Embodiment

A streaming reception client according to a fourth embodiment will be described. The streaming reception client includes the reception unit 8, the restoration unit 9, and the decoding unit 10, just like the client 7 illustrated in FIG. 1. The streaming reception client has functions equivalent to those of the client 7 described in the first embodiment, and thus a detailed description thereof will be omitted. The streaming reception client according to the fourth embodiment may successfully play streaming data even if reception delay occurs because of a decrease in the network bandwidth.

Components of the illustrated apparatuses are not necessarily physically configured in a manner as illustrated. Specifically, a specific configuration regarding distribution or integration of the apparatuses is not limited to the illustrated one, and all or some of the apparatuses may be configured in a functionally or physically distributed or integrated manner in given units in accordance with various load and usage states or the like. Also, the various processes described in the above embodiments may be implemented as a result of a computer, such as a personal computer or workstation, executing computer programs prepared in advance.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A streaming distribution system in which streaming data is transmitted, the streaming distribution system comprising:
   a server including a first processor configured to:
   encode streaming data,
   divide the encoded streaming data into a plurality of segments,
   rearrange at least one independently playable data item contained in a respective segment of streaming data from an original position to a position at a front side of the respective segment of streaming data, and
   transmit the rearranged respective segment of streaming data; and
   a client including a second processor configured to:
   receive the rearranged respective segment of streaming data from the server,
   determine whether an entirety of the respective segment of streaming data has been received based on a comparison of a received data size of the rearranged respective segment of streaming data with a total segment size of the respective segment of streaming data and a data size of the at least one independently playable data item contained in the rearranged respective segment of streaming data,
   restore the at least one independently playable data item contained in the rearranged respective segment of streaming data to the original position based on the determination, and
   decode the streaming data that has been restored.

2. The streaming distribution system according to claim 1, wherein the independently playable data item includes at least one of audio data, base layer data, and intra-frame data.

3. The streaming distribution system according to claim 1, wherein the client including the second processor is further configured to:
restore, with the client, the independently playable data item to the original position.

4. The streaming distribution system according to claim 1, wherein the server including the first processor is further configured to:
divide, with the server, the streaming data into a plurality of segments,
wherein the rearranging includes rearranging the independently playable data item contained in a segment, among the plurality of segments, to a position at a front side of the segment.

5. The streaming distribution system according to claim 4, wherein the at least one independently playable data item includes a plurality of independently playable data items, and when the plurality of independently playable data items are rearranged in the rearranging,
the rearranging includes rearranging an independently playable data item located in the vicinity of a center of the segment, among the plurality of independently playable data items, to a position at the front side of the segment.

6. The streaming distribution system according to claim 4, wherein the at least one independently playable data item includes a plurality of independently playable data items, and when the plurality of independently playable data items are rearranged in the rearranging and the plurality of independently playable data items include audio data,
the rearranging includes preferentially rearranging the audio data to a position at the front side of the segment over base layer data or intra-frame data.

7. The streaming distribution system according to claim 3, wherein the transmitting includes transmitting an instruction to the client, the instruction instructing the client to restore the rearranged independently playable data item to the original position, and
wherein the restoring includes restoring, in accordance with the instruction, the received independently playable data item to the original position.

8. The streaming distribution system according to claim 4, receiving, with the client, a segment,
wherein the dividing includes dividing the streaming data into the plurality of segments by controlling a coding rate of the streaming data in accordance with a traffic state between the server and the client,
wherein the receiving includes determining whether or not the entire segment has been successfully received within a certain limited period, and aborting reception of the segment if the entire segment has not been successfully received within the certain limited period, and
wherein the transmitting includes transmitting, to the client, the segment obtained by controlling the coding rate in accordance with the traffic state.

9. A streaming distribution method for transmitting streaming data, the streaming distribution method comprising:
encoding, by a first processor included in a server, streaming data;
dividing, by the first processor, the encoded streaming data into a plurality of segments;
rearranging, by the first processor, at least one independently playable data item contained in a respective segment of the streaming data from an original position to a position at a front side of the respective segment of streaming data;
transmitting, by the server, the rearranged respective segment of streaming data to the a client including a second processor;
receiving, by the client, the rearranged respective segment of streaming data from the server;
determining, by the second processor, whether an entirety of the respective segment of streaming data has been received based on a comparison of a received data size of the rearranged respective segment of streaming data with a total segment size of the respective segment of streaming data and a data size of the at least one independently playable data item contained in the rearranged respective segment of streaming data;
restoring, by the second processor, the at least one independently playable data item contained in the rearranged respective segment of streaming data to the original position based on the determination; and
decoding, by the second processor, the streaming data that has been restored.

10. The streaming distribution method according to claim 9,
wherein the independently playable data item includes at least one of audio data, base layer data, and intra-frame data.

11. The streaming distribution method according to claim 9, further comprising:
restoring, by the second processor, the independently playable data item to the original position.

12. The streaming distribution method according to claim 9, further comprising:
dividing, by the first processor, the streaming data into a plurality of segments,
wherein the rearranging includes rearranging the independently playable data item contained in a segment, among the plurality of segments, to a position at a front side of the segment.

13. The streaming distribution method according to claim 12,
wherein the at least one independently playable data item includes a plurality of independently playable data items, and when the plurality of independently playable data items are rearranged in the rearranging,
the rearranging includes rearranging an independently playable data item located in the vicinity of a center of the segment, among the plurality of independently playable data items, to a position at the front side of the segment.

14. The streaming distribution method according to claim 12,
wherein the at least one independently playable data item includes a plurality of independently playable data items, and when the plurality of independently playable data items are rearranged in the rearranging and the plurality of independently playable data items include audio data,
the rearranging includes preferentially rearranging the audio data to a position at the front side of the segment over base layer data or intra-frame data.

15. The streaming distribution method according to claim 11,
wherein the transmitting includes transmitting an instruction to the client, the instruction instructing the client to restore the rearranged independently playable data item to the original position, and wherein the restoring includes restoring, in accordance with the instruction, the received independently playable data item to the original position.

16. The streaming distribution method according to claim 12, further comprising:
receiving, by the client, a segment,
wherein the dividing includes dividing the streaming data into the plurality of segments by controlling a coding rate of the streaming data in accordance with a traffic state between the server and the client,
wherein the receiving includes determining whether or not the entire segment has been successfully received within a certain limited period, and aborting reception of the segment if the entire segment has not been successfully received within the certain limited period, and
wherein the transmitting includes transmitting, to the client, the segment obtained by controlling the coding rate in accordance with the traffic state.

17. A non-transitory computer-readable storage medium storing a streaming distribution program for transmitting streaming data that causes a computer to execute a process comprising:
encoding, by a first processor included in a server, streaming data;
dividing, by the first processor, the encoded streaming data into a plurality of segments;
rearranging, by the first processor, at least one independently playable data item contained in a respective segment of streaming data from an original position to a position at a front side of the respective segment of streaming data;
transmitting, by the server, the rearranged respective segment of streaming data to a client including a second processor;
receiving, by the client, the rearranged respective segment of streaming data from the server;
determining, by the second processor, whether an entirety of the respective segment of streaming data has been received based on a comparison of a received data size of the rearranged respective segment of streaming data with a total segment size of the respective segment of streaming data and a data size of the at least one independently playable data item contained in the rearranged respective segment of streaming data;
restoring, by the second processor, the at least one independently playable data item contained in the rearranged respective segment of streaming data to the original position based on the determination; and
decoding, by the second processor, the streaming data that has been restored.

* * * * *